May 6, 1924.

W. M. GRANT

EGG TURNING DEVICE

Filed Nov. 18, 1922

W. M. Grant,
INVENTOR

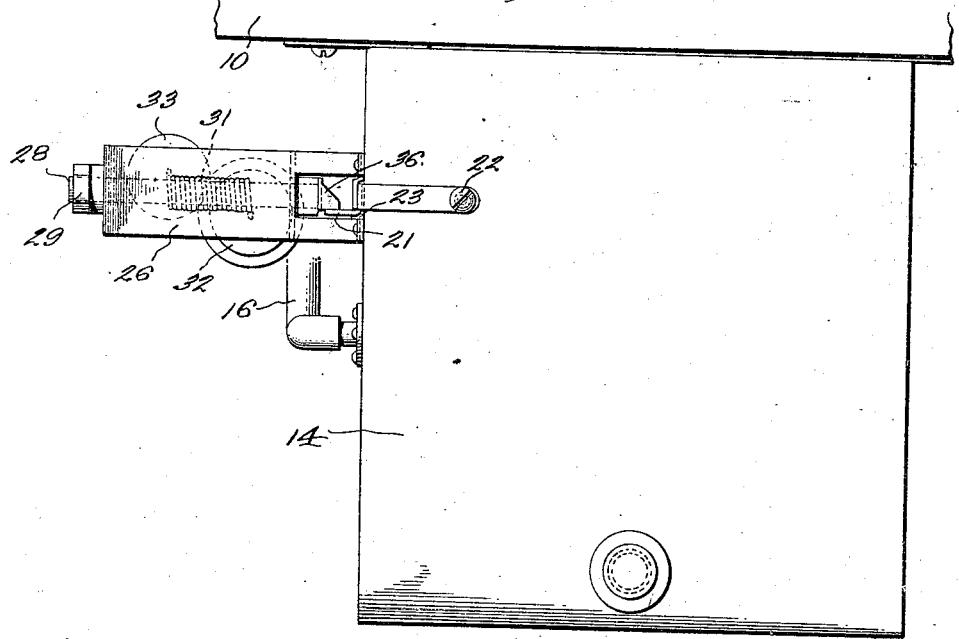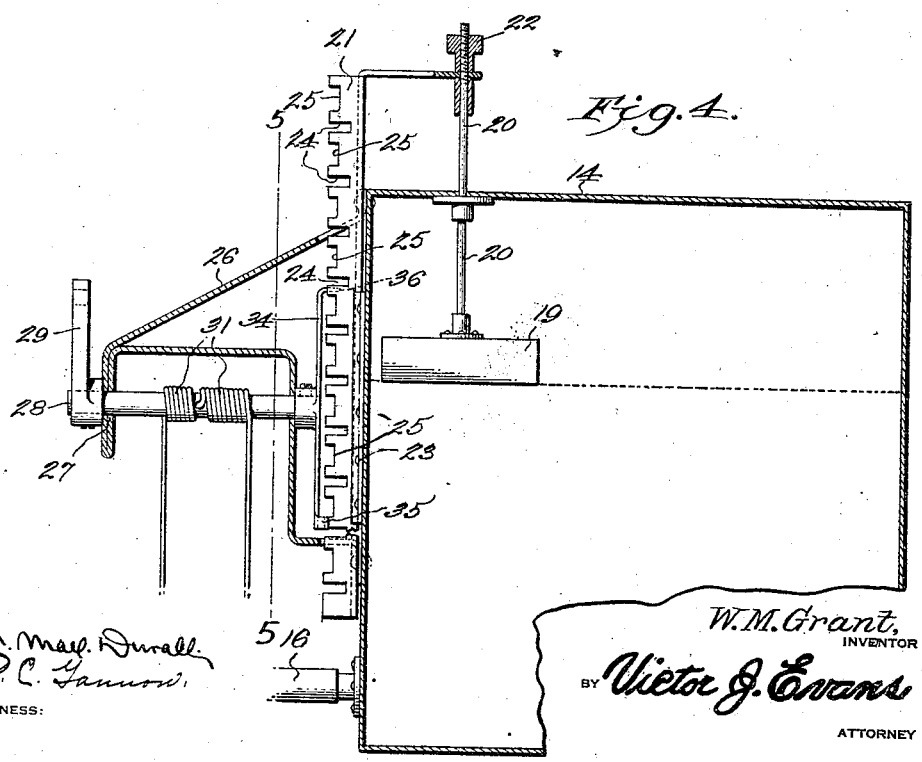

May 6, 1924.
W. M. GRANT
1,493,338
EGG TURNING DEVICE
Filed Nov. 18, 1922
3 Sheets-Sheet 3
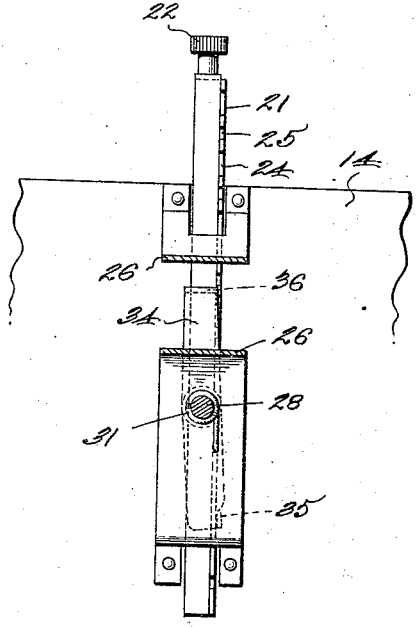
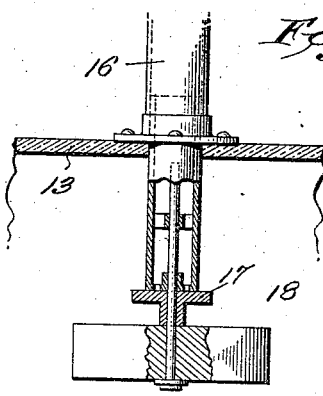
W. M. Grant,
INVENTOR
BY Victor J. Evans
ATTORNEY
WITNESSES Patented May 6, 1924.

1,493,338

UNITED STATES PATENT OFFICE.

WILLIAM M. GRANT, OF TOPEKA, KANSAS.

EGG-TURNING DEVICE.

Application filed November 18, 1922. Serial No. 601,808.

*To all whom it may concern:*

Be it known that I, WILLIAM M. GRANT, a citizen of the United States, residing at Topeka, in the county of Shawnee and State of Kansas, have invented new and useful Improvements in Egg-Turning Devices, of which the following is a specification.

This invention relates to incubators and has especial reference to new and improved means for intermittently operating the egg trays for the purpose of turning the eggs.

An object of the present invention is the provision of automatically operated means controlled by the heating means of an incubator (or more specifically, the fuel used for supplying the heat,) for operating the egg turning trays at intervals, so that the eggs will be properly turned during their period of incubation.

Another object of the invention is the provision of a device as above stated, which is simple in construction, positive in operation and which may be easily and readily attached to an incubator.

With the above and other objects in view, the invention further includes the following novel features and details of construction, to be hereinafter more fully described, illustrated in the accompanying drawings and pointed out in the appended claims.

In the drawings:—

Figure 3 is a top plan view.

Figure 4 is an enlarged vertical section through the fuel tank.

Figure 5 is a fragmentary vertical section on the line 5—5 of Figure 4.

Figure 6 is a detail section through the reservoir of the heater and showing the automatic fuel cut off.

Figure 1:
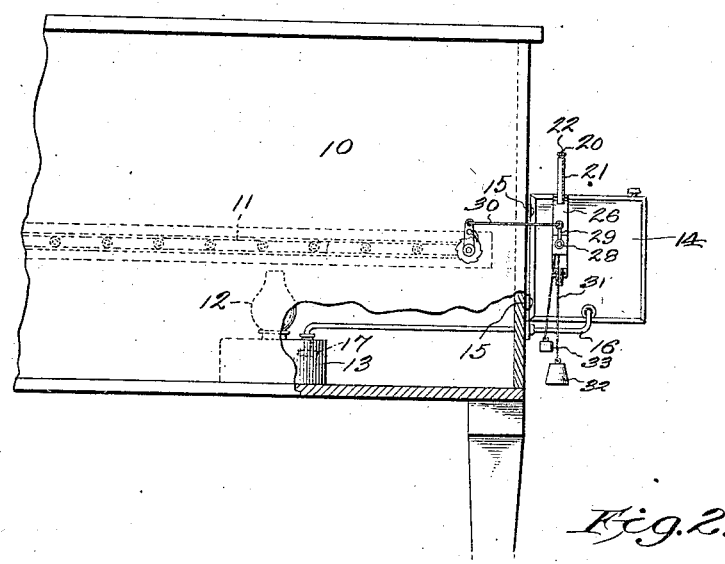
Figure 1 is a fragmentary sectional view showing a portion of an incubator with the invention applied, the latter being shown in elevation.
Figure 2:
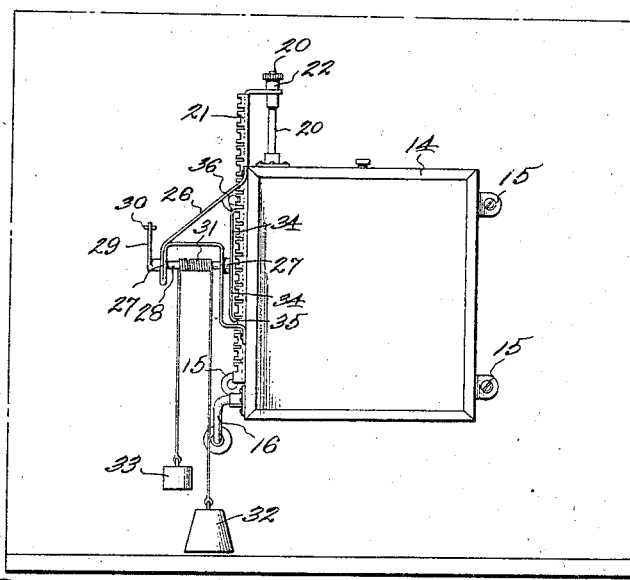
Figure 2 is a view at right angles to Figure 1.

Referring in detail to the drawings, wherein like characters of reference denote corresponding parts, the reference character 10 indicates a portion of an incubator, which is equipped with a turning tray 11 and a source of heat 12, the latter including a liquid reservoir 13 which is designed to contain fuel for the operation of the source of heat.

The invention which is designed for the intermittent operation of the turning trays, so as to provide for the automatic turning of the eggs within the incubator, includes a tank 14 which may be attached to the incubator in any suitable manner, such as is indicated at 15. The tank 14 supplies fuel to the reservoir 13 through a pipe 16 and the latter is provided with a valve 17 for controlling the flow of fuel therethrough, the said valve being operated by a float 18 which is connected to the stem of the valve and which operates to automatically shut off the flow of liquid from the tank 14 when the said liquid reaches a predetermined height within the reservoir.

Located within the tank 14 is a vertically movable float 19, which has attached thereto one end of a rod 20, the said rod extending upward through the top of the tank and being connected to one end of a stop bar 21, as shown at 22.

The stop bar 21 is angular in cross section and is guided for longitudinal movement upon the tank 10 by means of a guide 23, while transversely arranged spaced notches 24 and 25 are provided along one edge of the bar 21, the notches 24 being relatively narrow and deep, while the notches 25 are relatively shallow and wide and are alternately arranged.

Secured to the tank 14 is a bearing bracket 26, whose bifurcated ends straddle the bar 21 and are secured to the tank. This bracket provides spaced bearings 27 for a rotatably mounted shaft 28, the latter having secured to one end an arm 29. This arm is secured to the tray 11 by means of a connecting rod 30, so that when the shaft is rotated, its arm and rod connection with the tray 11 will cause the latter to move so as to turn the eggs. The shaft 28 is weight operated and for this purpose has wound thereon a cord or chain 31, having weights 32 and 33 connected to its opposite ends, the weight 32 being considerably heavier than the weight 33 so as to overcome the weight of the latter to rotate the shaft. By pulling upon the weight 33, the shaft may be rotated in an opposite direction to rewind the cord or chain.

Secured to the inner end of the shaft 28 are oppositely and radially extending arms 34, one of said arms carrying at its outer end a right angularly disposed relatively wide stop 35 which is of comparatively short length, while the other arm carries a right angularly disposed relatively narrow and long stop 36. The first mentioned stop is adapted for passage through the notches 25, but is too wide for passage through the notches 24, while the length of the stop 36 is such as to prevent its passage through the notches 25 while its width will permit of its passage through the notches 24. As the bar 21 is located in the path of movement of the stops 35 and 36 it may only rotate under the action of the weight 32 when the stops are in proper position for passage through their respective notches.

In the operation of the invention, when the fuel within the reservoir 13 falls below a predetermined level, the valve 17 will automatically open to permit liquid fuel to flow from the tank 14 into the reservoir. As the level of the fuel within the tank decreases, the float 19 will descend and will carry with it the bar 21 until one of the notches is in position to permit of the passage of the proper stop, whereupon the shaft 28 will rotate one-half revolution, rotation ceasing when one of the stops 35 or 36 engages the bar 21. This operation of the shaft 28 will, through the connection previously described, cause the operation of the turning tray to turn the eggs. The parts will remain in this position until a further decrease of fuel within the reservoir 13, whereupon the operation will be repeated and the eggs will be again turned.

The invention is susceptible of various changes in its form, proportions and minor details of construction and the right is herein reserved to make such changes as properly fall within the scope of the appended claims.

Having described the invention what is claimed is:—

1. The combination with an incubator including a heater having a liquid fuel reservoir and an egg turning tray, of a fuel supply tank, means connecting the tank with the reservoir to supply fuel to the same, a float movable within the tank, a weight operated rotatably mounted shaft operatively connected to the tray, a member rotated by the shaft, a stop located in the path of movement of said member to prevent rotation of the shaft and means connecting said stop and float to move the former and permit of a limited movement of the shaft.

2. The combination with an incubator including a heater having a liquid fuel reservoir and an egg turning tray, of a fuel supply tank, means connecting the tank with the reservoir to supply fuel to the same, a float movable within the tank, a weight operated rotatably mounted shaft operatively connected to the tray, a member rotated by the shaft, a longitudinally movably stop located in the path of movement of said member to prevent rotation of the shaft and means connecting said stop and float to move the former and permit of a limited movement of the shaft.

3. The combination with an incubator including a heater having a liquid fuel reservoir and an egg turning tray, of a fuel supply tank, means connecting the tank with the reservoir for supplying fuel to the same, a float movable within the tank, a weight operated rotatably mounted shaft operatively connected to the tray, a member rotated by the shaft, a longitudinally movable notched bar located in the path of movement of said member to prevent rotation of the shaft and means connecting said bar and float to move the former and permit of a limited movement of the shaft.

4. The combination with an incubator including a heater having a liquid fuel reservoir and an egg turning tray, of a fuel supply tank, means connecting the tank with the reservoir to supply fuel to the same, a float movable within the tank, a weight operated rotatably mounted shaft operatively connected to the tray, radially disposed arms extending upon opposite sides of and secured to the shaft, a stop located in the path of said arms to prevent rotation of the shaft and means connecting said stop and float to move the former and permit of a limited movement of the shaft.

5. The combination with an incubator including a heater having a liquid fuel reservoir and an egg turning tray, of weight operated means connected to the tray for operating the latter, means rendering the weight operated means inactive and means controlled by the passage of fuel from the reservoir for intermittently releasing the weight operated means.

6. The combination with an incubator including a heater having a liquid fuel reservoir and an egg turning tray, of means operatively connected to the tray for moving the latter to turn the eggs, means holding the tray moving means inactive and means controlled by the consumption of fuel for intermittently releasing the tray operating holding means.

In testimony whereof I affix my signature.

WILLIAM M. GRANT.